United States Patent
Robins et al.

(10) Patent No.: US 6,888,613 B2
(45) Date of Patent: May 3, 2005

(54) DIFFRACTIVE FOCUSING USING MULTIPLE SELECTIVELY LIGHT OPAQUE ELEMENTS

(75) Inventors: Mark N. Robins, Greeley, CO (US); Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 10/087,483

(22) Filed: Mar. 1, 2002

(65) Prior Publication Data

US 2003/0164922 A1 Sep. 4, 2003

(51) Int. Cl.[7] ............................................. G02F 1/13
(52) U.S. Cl. ................................. 349/201; 359/573
(58) Field of Search ............................ 349/201, 202; 359/573, 565, 15

(56) References Cited

U.S. PATENT DOCUMENTS

| 4,601,545 | A | | 7/1986 | Kern ..................... 350/347 V |
|---|---|---|---|---|
| 4,904,063 | A | | 2/1990 | Okada et al. ........... 350/347 V |
| 4,909,626 | A | | 3/1990 | Purvis et al. ............... 356/332 |
| 5,069,813 | A | | 12/1991 | Patel ..................... 252/299.01 |
| 5,150,234 | A | | 9/1992 | Takahashi et al. ............ 359/65 |
| 5,340,978 | A | * | 8/1994 | Rostoker et al. ......... 250/208.1 |
| 6,124,920 | A | * | 9/2000 | Moseley et al. ............ 349/201 |
| 6,172,792 | B1 | * | 1/2001 | Jepsen et al. ............... 359/254 |
| 6,445,406 | B1 | * | 9/2002 | Taniguchi et al. ............ 348/51 |
| 6,476,550 | B1 | * | 11/2002 | Oda et al. .................... 313/504 |
| 6,687,030 | B2 | * | 2/2004 | Popovich et al. ............. 359/15 |
| 2002/0105725 | A1 | * | 8/2002 | Sweatt et al. | |

* cited by examiner

Primary Examiner—Tarifur R. Chowdhury
Assistant Examiner—Thoi V. Duong

(57) ABSTRACT

A diffractive focusing device includes a light transmissive substrate and a plurality of selectively light opaque elements formed in the light transmissive substrate. The selectively light opaque elements are capable of being electronically activated. Particular elements of the plurality of selectively light opaque elements are selectively rendered substantially light opaque or substantially light-transmissive in order to create light transmissive channels in the light transmissive substrate with desired diffractive characteristics.

24 Claims, 4 Drawing Sheets

(SECTION A-A)

DIFFRACTIVE FOCUSING USING MULTIPLE SELECTIVELY LIGHT OPAQUE ELEMENTS

FIELD OF THE INVENTION

The present invention relates generally to a light focusing device, and more particularly to a light focusing device that operates by diffraction.

BACKGROUND OF THE INVENTION

Many types of electronic imaging devices employ some manner of focusing device for focusing light on a desired region. For example, cameras and medical imaging devices may employ a focusing device. The focusing device operates to focus light, typically light from a subject onto some manner of light sensitive surface, such as film or an electronic sensor.

In the prior art, focusing typically relies on a lens arrangement that includes two or more lenses. The lens arrangement may achieve a variable focus distance by mechanically moving one lens with respect to another.

The prior art light focusing method has several drawbacks. Optical refractive lenses are heavy and large. A variable focus lens incorporating two or more lenses therefore is even larger and heavier. Furthermore, a mechanical variable lens apparatus that moves one or more lenses requires a lot of electrical power to operate. Moreover, a mechanical variable lens apparatus is subject to dirt and wear with the resulting loss of reliability.

Therefore, there remains a need in the art for improved light focusing devices.

SUMMARY OF THE INVENTION

A diffractive focusing device comprises a light transmissive substrate and a plurality of selectively light opaque elements formed in the light transmissive substrate. The selectively light opaque elements are capable of being electronically activated. Particular elements of the plurality of selectively light opaque elements are selectively rendered substantially light opaque or substantially light-transmissive in order to create channels in the light transmissive substrate with the desired diffractive characteristics.

DETAILED DESCRIPTION

Figure 1:
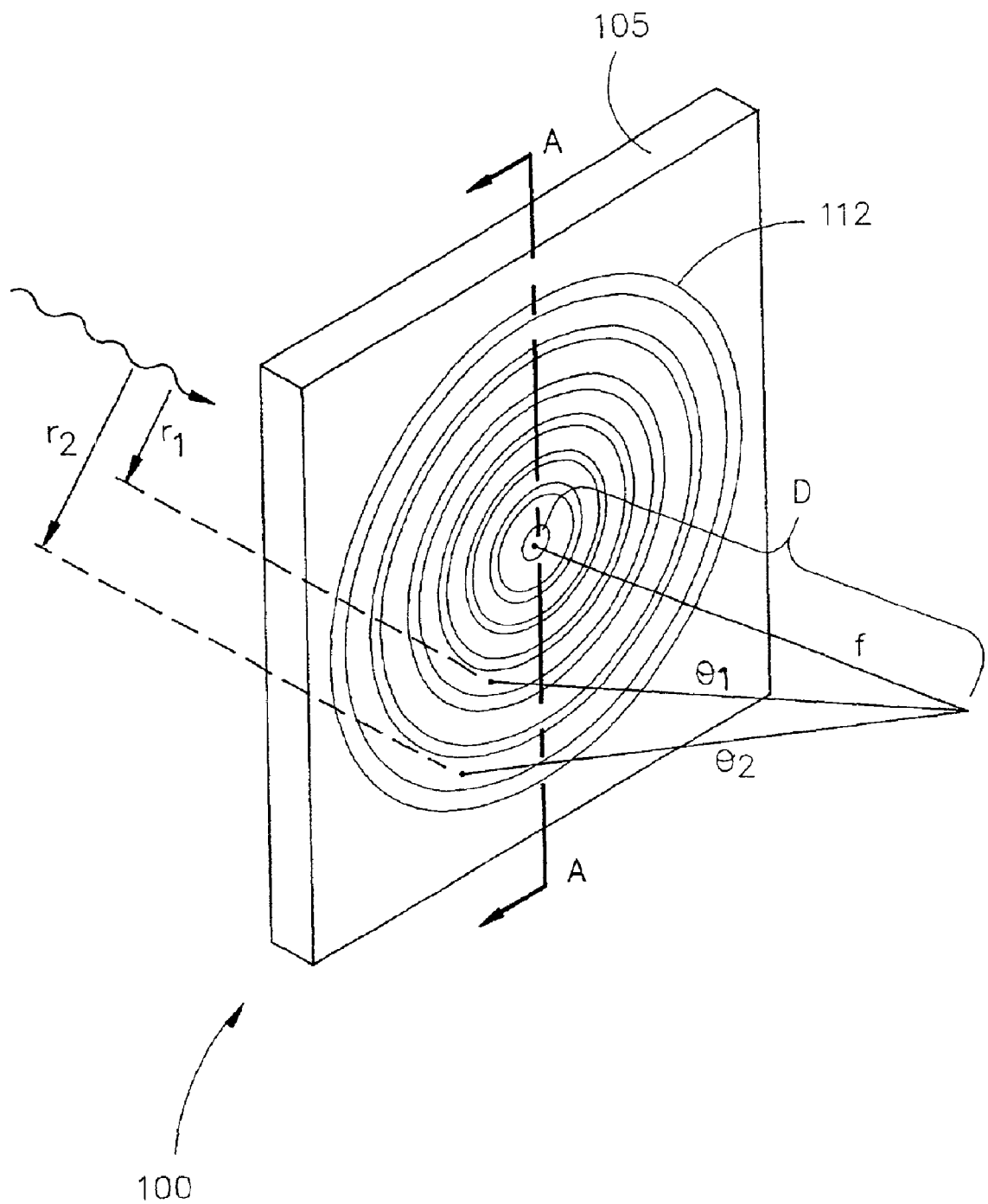
FIG. 1 shows a diffractive focusing device according to one embodiment of the invention.

FIG. 1 shows a diffractive focusing device 100 according to one embodiment of the invention. The diffractive focusing device 100 includes a substrate 105 and a plurality of selectively light opaque elements 112 formed in the substrate 105. The substrate 105 may be any type of light transmissive substrate, such as glass or plastic, for example.

The plurality of selectively light opaque elements 112 may be any type of material that may be selectively rendered light transmissive or light opaque by application of a voltage. For example, the plurality of selectively light opaque elements 112 may comprise liquid crystal display (LCD) elements. The plurality of selectively light opaque elements 112 are formed in the substrate 105, and in one embodiment are flush with the exterior surface of the substrate 105.

In one embodiment, the elements 112 may be formed in a successive fashion, with an element 112 being formed substantially contiguously with neighboring elements. Therefore, light transmissive channels are formed only by non-activated elements 112. If every other element is activated, the non-activated elements form light transmissive channels one element in width. If every fifth element is activated, the non-activated elements form light transmissive channels four elements in width. By controlling which elements are transmissive and which are opaque, the channels are formed with variable spacing and therefore of varying density or pitch (where pitch is the number of light transmissive channels per unit of length, i.e., the density of light transmissive channels).

Alternatively, the plurality of selectively light opaque elements 112 may be formed in a spaced-apart relationship, thereby forming channels in between successive elements 112. Light is always transmitted through the channels, but is only transmitted through the elements 112 when they are not activated (i.e., when they are light transmissive). When the selectively light opaque elements 112 are activated, they become substantially light opaque, and light is transmitted only through the channels between the elements 112. This baseline spacing of alternating opaque, transparent, opaque, etc., provides the finest pitch available on the diffractive focusing device 100. However, this approach does limit flexibility in selecting inter-transparent region pitch.

A selectively light opaque element 112 may be formed of any size, with the number of elements 112 correspondingly chosen to accommodate desired focus distances. For example, an element 112 may have any width corresponding to optical wavelengths. It should be understood that smaller elements may enable a higher channel density (i.e., a higher number of light transmissive channels per unit length), and therefore may enable a finer focus control and finer focus resolution. Consequently, the number of elements 112 in the diffractive focusing device 100 may be chosen in order to provide a desired light transmissive channel density.

The number of activated elements 112 determines the density/pitch of light transmissive channels in the device. As more elements 112 are activated, the channel density increases. Therefore, by selectively activating particular elements 112, the channel density may be varied. The channel density affects the diffractive characteristics of the focusing device 100 (see FIGS. 2–3 below and the accompanying discussion). The number of light transmissive channels per unit length of the diffractive focusing device 100 determines the angle of refraction as a function of the radial distance r. The number of activated elements 112 may be changed as needed, and therefore may control a focal distance of the diffractive focusing device 100 by varying the density of light transmissive channels.

The effective source rings are the light transmissive rings situated between annular elements 112 (i.e., the channels in the substrate 105). The effective source rings may include non-activated elements 112. To focus at a distance D, the spacing $\Delta$ between effective source rings is:

$$\Delta = [(h+\lambda)^2 - D^2]^{1/2} \quad (1)$$

where $$h=[r^2+D^2]^{1/2} \qquad (2)$$

and where λ is the wavelength of incident light, D is the focal distance, and r is the radial distance to the effective source rings.

It should be noted that in one embodiment, the annular elements 112 may be concentrically and uniformly spaced. Due to the concentric nature of this embodiment (i.e., due to its symmetry), this configuration may effectively eliminate polarization concerns except for the uniform loss factors. Because a monolithic LCD polarizes light transmitted through the device, it passes light of only one polarization direction when not activated. However, in an annular elements embodiment, the elements 112 may be constructed so that element portions may have orthogonal polarization directions. For example, each annular element 112 may not possess a uniform polarization direction, wherein portions that are 90 degrees apart have orthogonal polarization directions. When the light passing through these portions recombines, the original polarization state is achieved. The overall result is that the polarization of incident light is substantially unchanged. Because the annular elements possess a rotational symmetry, there can be no preferred output polarization state.

The concentric nature of this embodiment of the diffractive focusing device 100 may additionally include an embodiment employing two coaxially arranged diffractive focusing devices 100 (i.e., a dual diffractive focusing device arrangement). This may be done in order to achieve chromatic correction.

Chromatic aberration in a curved lens occurs because the index of refraction is a function of wavelength, wherein blue light at the edge of the lens is brought to a focus closer to the lens than the red light, resulting in a color distortion. A correction for this is typically done in the prior art by the addition of a correcting lens positioned after the focusing lens. The correcting lens of the prior art typically includes a parabolic face that realigns the focal points of light of different wavelengths.

In the dual diffractive focusing device according to the invention, chromatic correction may be accomplished by a second annular diffractive focusing device 100 (not shown) placed after a primary diffractive annular focusing device 100. The second focusing device is controlled to have a second spacing $\Delta_2(r)$ between elements 112. This is in contrast to the primary focusing device which has a spacing of $\Delta_1(r)$ between elements 112. The second spacing $\Delta_2(r)$ may be controlled to be less than the spacing $\Delta_1(r)$ of the primary focusing device in order to correct the chromatic aberration. It should be noted that the dual diffractive focusing device could be formed as a monolithic focusing device that may include one or more of such focusing devices.

It should be understood that although a diffractive focusing device formed of concentric rings is shown, other arrangements may be employed. Alternatively, the diffractive focusing device may be formed of a plurality of linear bands, for example.

Figure 2:
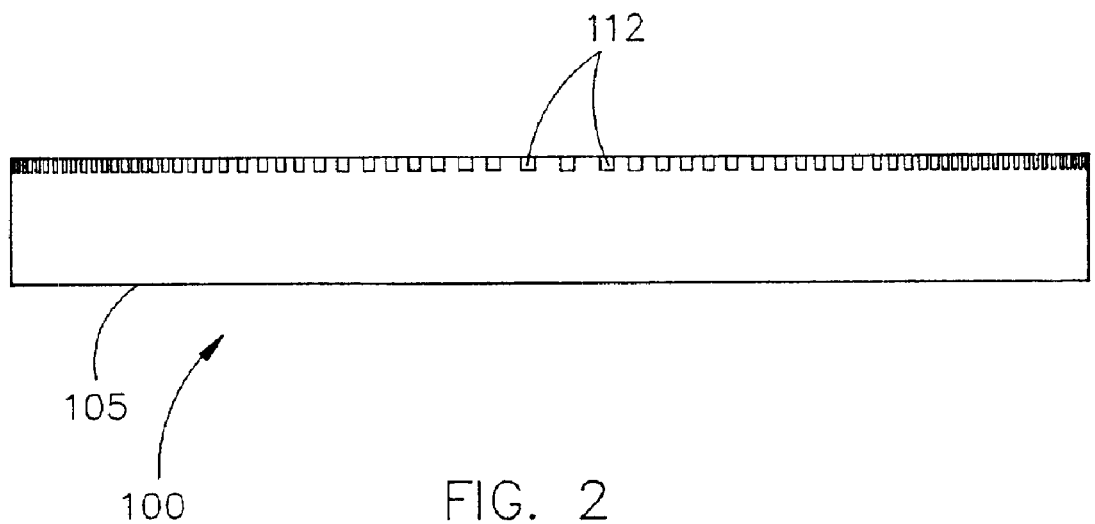
FIG. 2 is a section view AA showing how the channel density may vary across the diffractive focusing device.

FIG. 2 is a section view AA showing how the channel density may vary across the diffractive focusing device 100 by activating particular elements 112. It should be understood that the elements 112 may be contiguous, and therefore when every other element 112 is activated, the spacing between elements and the density of elements is uniform. However, in a concentric ring arrangement, the elements 112 may be activated to achieve a higher density near the periphery of the device, as shown. This may result in a greater change in diffraction of light at the periphery, similar to the effect of a convex lens. By selectively activating elements 112, the diffractive focusing device 100 may create channels of varying density.

It should be understood that in one embodiment of the diffractive focusing device 100, the elements 112 may be constructed to be increasingly dense moving outward from the center of the device. Therefore, the number of elements 112 may increase near the periphery of the diffractive focusing device 100.

Although the figure shows the elements 112 having a substantial thickness and width, it should be understood that the figure is not to scale. The elements 112 may be formed of any desired thickness and width. In addition, the elements 112 may be formed on the substrate 105 or may be formed in the substrate 105.

Figure 3:
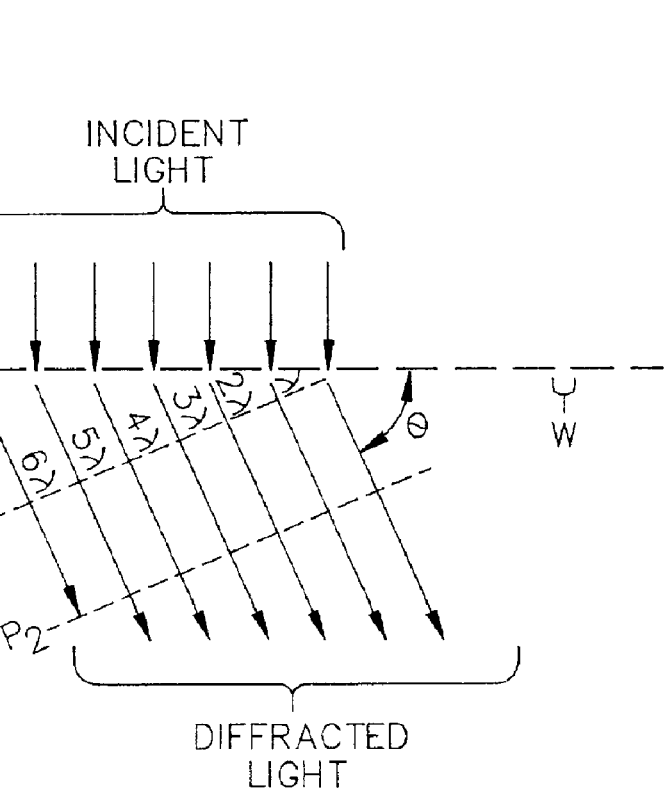
FIG. 3 shows how the diffraction characteristics of the diffractive focusing device change the direction of incident light.

FIG. 3 shows how the diffraction characteristics of the diffractive focusing device 100 change the direction of incident light. In this example, the elements 112 are represented as dashed lines spaced apart by a constant channel width W. The incident light is a plane wave. Due to the wave properties of light, the light is diffracted as it passes through the channels W. The angle of diffraction θ is determined by the spacing of the activated rings, i.e., by the density or pitch of light transmissive channels formed by the activated elements 112. As a result, at plane P1 the trajectory lengths of the diffracted light differ by an integral number of wavelengths and thus constructively interfere. At plane P2 the light is back in phase due to a constructive interference effect. It should be noted that the angle of diffraction θ may be changed by changing the density of transmissive elements 112, and therefore incident light at different regions of the diffractive focusing device 100 may be diffracted by varying amounts. The result is an electronically controllable, variable diffraction grating.

Figure 4:
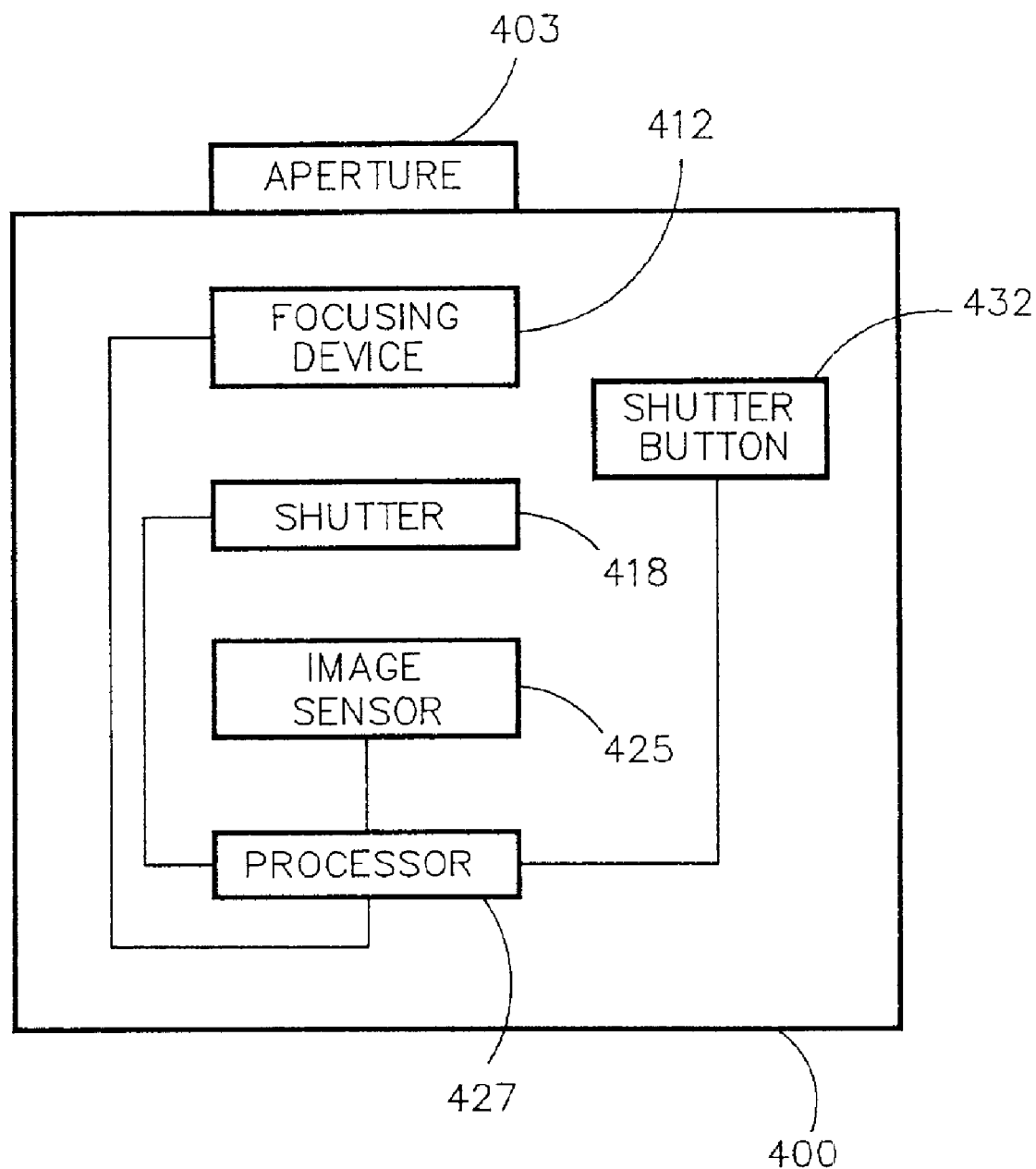
FIG. 4 is a schematic of an image capturing device according to yet another embodiment of the invention.

FIG. 4 is a schematic of an image capturing device 400 according to another embodiment of the invention. The image capturing device 400 may include an aperture 403, a focusing device 412, a shutter 418, an image sensor 425, a processor 427, and a shutter button 432.

The image sensor 425 may be any type of image sensor, including an electronic image sensor (such as a CCD or CMOS array) or conventional film. The shutter 418 may be any type of shutter that regulates incident light from the aperture 403. It should be noted that alternatively the shutter 418 may be positioned between the aperture 403 and the focusing device 412.

The focusing device 412 is a diffractive focusing device according to any embodiment of the invention. The focusing device 412 may include multiple diffractive focusing devices, and may include selectively light opaque elements of any size, shape, or configuration.

In operation, the processor 427 detects a press of the shutter button 432. This may be a partial depression of the shutter button 432, such as for setting focus, exposure speed or flash, or may be a full press of the shutter button 432, such as for capturing an image. Before the image capture occurs, the processor 427 may control the focusing device 412 in order to focus light from the aperture 403 onto the image sensor 425. The focusing may include selectively activating elements in order to obtain a desired focal distance D. The focal distance D may be chosen by the user or may be automatically sensed by the image capturing device 400, such as, for example through the use of a distance measuring mechanism. It should be noted that alternatively the focusing device 412 may be operated to vary the focal distance during the image capturing process, i.e., the focusing device 412 does not necessarily have to stay at a fixed focus depth during an entire image capturing process.

Figure 5:
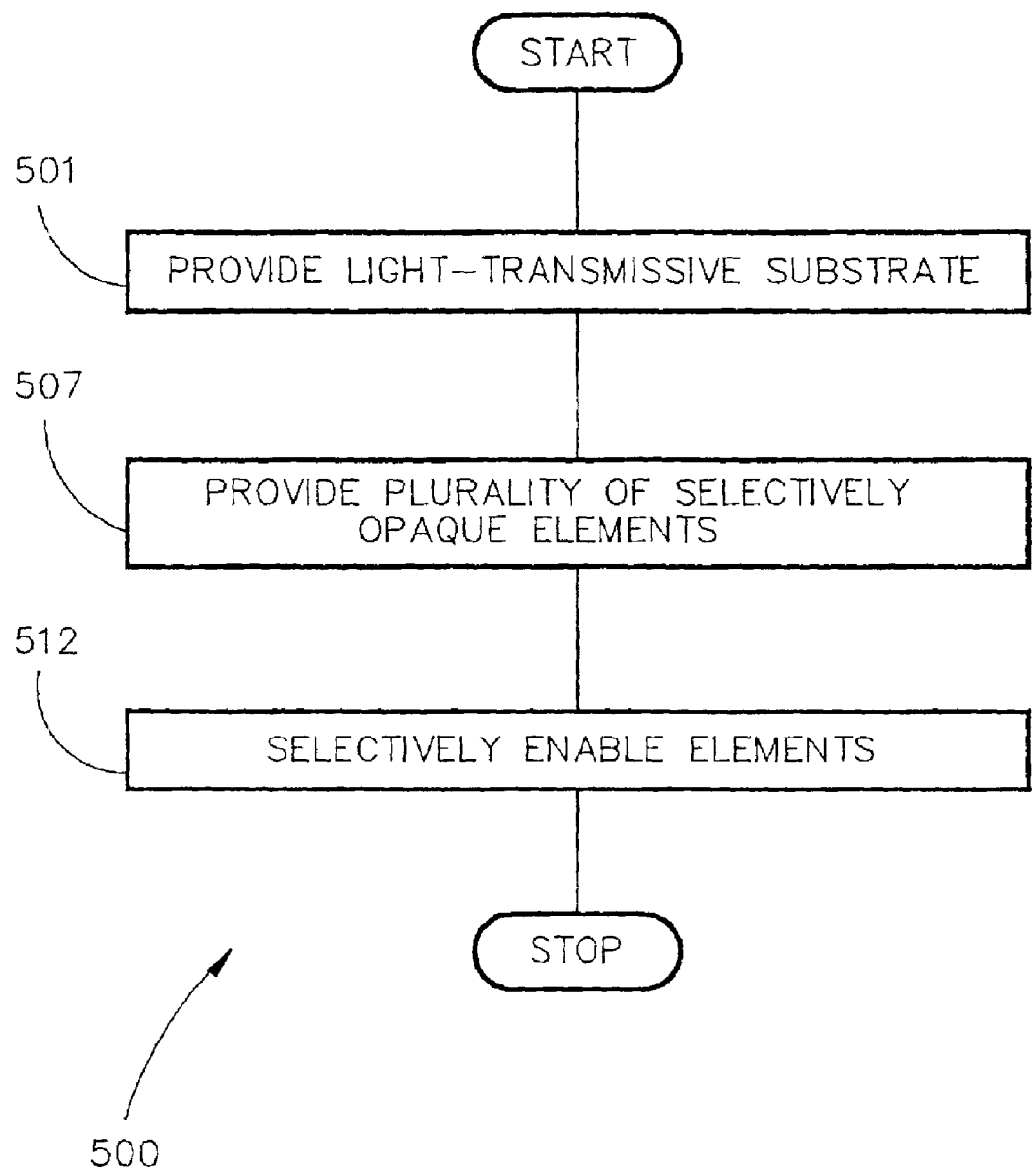
FIG. 5 is a flowchart of a method of focusing light according to yet another embodiment of the invention.

FIG. 5 is a flowchart 500 of a method of focusing light according to another embodiment of the invention. In step 501, a light transmissive substrate is provided. The light transmissive substrate may be glass or plastic, for example.

In step 507, a plurality of selectively light opaque elements are provided. The selectively light opaque elements may be LCD elements, for example, and may be formed in any shape. Moreover, the elements may be formed to be flush with the exterior surface of the substrate. The elements may be formed in a contiguous or spaced-apart relation, forming channels in the substrate when activated. It should be noted that the distance between adjacent selectively light opaque elements may be regular or irregular.

In step 512, the selectively light opaque elements may be selectively activated to provide light transmissive channels of varying pitches. Multiple elements may be activated at any one time.

The diffractive focusing according to the invention may be used for any image capturing device, including still cameras, video cameras, optical measurement instruments, medical imaging devices, etc. The invention may be used for focusing full spectrum light, monochromatic light, filtered light of particular wavelengths, etc. In addition, polarized light may be focused according to the invention.

The diffractive focusing according to the invention differs from the prior art in that the invention comprises an electronically actuated focusing device. The focusing device according to the invention does not mechanically move. The diffractive focusing device according to the invention is a thin, flat, compact electronic device with no moving parts. The invention uses varying light transmissive channels of varying widths in order to vary the diffraction characteristics of incident light.

The diffractive focusing according to the invention provides several benefits. It provides an electronically actuated focusing device that is small, flat, and contains no moving parts. The diffractive focusing device therefore is not subject to dirt and wear, consumes relatively low electrical power, and enjoys a faster response time than a mechanical focusing device. Furthermore, the diffractive focusing according to the invention may implement a non-uniform focusing pattern, where different regions of a focusing device are focused at different focal distances.

We claim:

1. A diffractive focusing device for focusing light from a subject onto a focal plane located a distance D from said device, comprising:
    a light transmissive substrate;
    a plurality of selectively light opaque elements supported by said light transmissive substrate and being selectively controlled to be either substantially light opaque or substantially light transmissive;
    said plurality of selectively light opaque elements being controlled to form a focusing diffraction grating pattern of light transmissive channels separated by light opaque regions, said focusing diffraction grating pattern having a variable spacing between successive light transmissive channels, which spacing varies as a function of D, such that light from said subject passing through said focusing device is focused onto said focal plane.

2. The device of claim 1, wherein said plurality of selectively light opaque elements are comprised of liquid crystal material.

3. The device of claim 1, wherein said focusing diffraction grating pattern is a concentric plurality of light transmissive rings.

4. The device of claim 3, wherein a spacing Δ between successive light transmissive channels is determined by the following equation:

$$\Delta = [(h+\lambda)^2 - D^2]^{1/2}$$

where $h = [r^2 + D^2]^{1/2}$;
    r is the radial distance from the center of said focusing diffraction pattern to the outermost light transmissive channel;
    D is the focal distance to said focal plane; and
    λ is a wavelength of light incident on said focusing device.

5. The device of claim 1, wherein said plurality of selectively light opaque elements are formed in said substrate so as to be substantially flush with an exterior surface of said substrate.

6. The device of claim 1, wherein said plurality of selectively light opaque elements are formed on said substrate.

7. The device of claim 1, further comprising in combination a corrective diffractive device positioned substantially coaxially with said diffractive focusing device, said corrective diffractive device comprising a light transmissive substrate, a plurality of selectively light opaque elements supported by said light transmissive substrate and being selectively controlled to be either substantially light opaque or substantially light transmissive;
    said plurality of selectively light opaque elements of said corrective diffractive device being controlled to form a correcting diffraction grating pattern of light transmissive channels separated by light opaque regions, said correcting diffraction grating pattern having a spacing between successive light transmissive channels that is different from the spacing of said focusing diffraction grating pattern.

8. A diffractive focusing apparatus for focusing light from a subject onto a focal plane located a distance D from said device, said apparatus comprising a focusing device including:
    a light transmissive substrate;
    a plurality of selectively light opaque elements supported by said light transmissive substrate and being selectively controlled to be either substantially light opaque or substantially light transmissive;
    said plurality of selectively light opaque elements being controlled to form a focusing diffraction grating pattern of light transmissive channels separated by light opaque regions, said focusing diffraction grating pattern having a variable spacing between successive light transmissive channels, which spacing varies as a function of D, such that light from said subject passing through said focusing device is focused onto said focal plane; and
    a corrective device positioned substantially coaxially with said focusing device, said corrective device including a light transmissive substrate, a plurality of selectively light opaque elements supported by said light transmissive substrate and being selectively controlled to be either substantially light opaque or substantially light transmissive;
    said plurality of selectively light opaque elements of said corrective device being controlled to form a correcting diffraction grating pattern of light transmissive channels separated by light opaque regions, said correcting diffraction grating pattern having a spacing between successive light transmissive channels that is different from the spacing of said focusing diffraction grating pattern.

9. The apparatus of claim 8, wherein said plurality of selectively light opaque elements of said focusing device are comprised of liquid crystal material.

10. The apparatus of claim 8, wherein said focusing diffraction grating pattern is a concentric plurality of light transmissive rings.

11. The apparatus of claim 10, wherein a spacing $\Delta$ between successive light transmissive channels of said focusing device is determined by the following equation:

$$\Delta=[(h+\lambda)^2-D^2]^{1/2}$$

where $h=[r^2+D^2]^{1/2}$;

r is the radial distance from the center of said focusing diffraction pattern to the outermost light transmissive channel;

D is the focal distance to said focal plane; and $\lambda$ is a wavelength of light incident on said focusing device.

12. The apparatus of claim 8, wherein said plurality of selectively light opaque elements of said focusing device are formed in said substrate so as to be substantially flush with an exterior surface of said substrate.

13. The apparatus of claim 8, wherein said plurality of selectively light opaque elements of said focusing device are formed on said substrate.

14. An image capturing apparatus, comprising:

an image sensor;

a diffractive focusing device for focusing light from a subject onto said image sensor located a distance D from said device, including a light transmissive substrate;

a plurality of selectively light opaque elements supported by said light transmissive substrate and being selectively controlled to be either substantially light opaque or substantially light transmissive;

said plurality of selectively light opaque elements being controlled to form a focusing diffraction grating pattern of light transmissive channels separated by light opaque regions, said focusing diffraction grating pattern having a variable spacing between successive light transmissive channels, which spacing varies as a function of D, such that light from said subject passing through said focusing device is focused onto said image sensor.

15. The image capturing apparatus of claim 14, further comprising a shutter between said diffractive focusing device and said image sensor.

16. The image capturing apparatus of claim 14, wherein said image sensor comprises an array of solid state light sensitive elements.

17. The image capturing apparatus of claim 16, wherein said image sensor comprises a CCD array.

18. The image capturing apparatus of claim 14, wherein said image sensor comprises photographic film.

19. The image capturing apparatus of claim 14, wherein said plurality of selectively light opaque elements are comprised of liquid crystal material.

20. The image capturing apparatus of claim 14, wherein said focusing diffraction grating pattern is a concentric plurality of light transmissive rings.

21. The image capturing apparatus of claim 20, wherein a spacing $\Delta$ between successive light transmissive channels is determined by the following equation:

$$\Delta=[(h+\lambda)^2-D^2]^{1/2}$$

where $h=[r^2+D^2]^{1/2}$;

r is the radial distance from the center of said focusing diffraction pattern to the outermost light transmissive channel;

D is the focal distance to said focal plane; and $\lambda$ is a wavelength of light incident on said focusing device.

22. The image capturing apparatus of claim 14, wherein said plurality of selectively light opaque elements are formed in said substrate so as to be substantially flush with an exterior surface of said substrate.

23. The image capturing apparatus of claim 14, wherein said plurality of selectively light opaque elements are formed on said substrate.

24. The image capturing apparatus of claim 14, further comprising in combination a corrective diffractive device positioned substantially coaxially with said diffractive focusing device, said corrective diffractive device comprising a light transmissive substrate, a plurality of selectively light opaque elements supported by said light transmissive substrate and being selectively controlled to be either substantially light opaque or substantially light transmissive;

said plurality of selectively light opaque elements of said corrective diffractive device being controlled to form a correcting diffraction grating pattern of light transmissive channels separated by light opaque regions, said correcting diffraction grating pattern having a spacing between successive light transmissive channels that is different from the spacing of said focusing diffraction grating pattern.

* * * * *